United States Patent [19]
Sabin

[11] Patent Number: 4,972,474
[45] Date of Patent: Nov. 20, 1990

[54] INTEGER ENCRYPTOR

[75] Inventor: Michael J. Sabin, Sunnyvale, Calif.

[73] Assignee: Cylink Corporation, Sunnyvale, Calif.

[21] Appl. No.: 345,803

[22] Filed: May 1, 1989

[51] Int. Cl.⁵ .............................................. H04L 9/00
[52] U.S. Cl. ...................................... 380/28; 380/43; 380/49; 380/46
[58] Field of Search .................... 380/28, 43, 49, 46

[56] References Cited

U.S. PATENT DOCUMENTS

| | | |
|---|---|---|
| 3,111,579 | 11/1963 | Ehrat . |
| 3,210,730 | 10/1965 | Ehrat . |
| 3,291,908 | 12/1966 | Ehrat . |
| 3,436,478 | 4/1969 | Ehrat . |
| 3,657,476 | 4/1972 | Aiken . |
| 3,808,365 | 4/1974 | Ehrat . |
| 3,909,533 | 9/1975 | Willimann . |
| 3,959,592 | 5/1976 | Ehrat . |
| 4,037,160 | 7/1977 | Miloradovic et al. . |
| 4,052,565 | 10/1977 | Baxter et al. . |
| 4,068,089 | 1/1978 | Kuhnlien et al. . |
| 4,068,094 | 1/1978 | Schmid et al. . |
| 4,086,435 | 4/1978 | Graupe et al. . |

(List continued on next page.)

OTHER PUBLICATIONS

S. B. Weinstein, "Sampling-Based Techniques for Voice Scrambling," 1980.
Product Description: SVX-1000 Telephone Voice Security Terminal, by Motorola.
May 1979; Aron D. Wyner; "An Analog Scrambling Scheme Which Does Not Expand Bandwidth, Pt.I-Discrete Time," IEEE *Transactions on Information Theory*, vol. IT-25, No. 3.
Jan. 1984; Bob Lucky; "The Awful Truth About the Technical Papermill."
1987; E. F. Brickell; P. J. Lee and Y. Yacobi, "Secure Radio Teleconference".
1987; E. F. Brickell, Y. Yacobi; "On Privacy Homomorphisms (extended Abstract)".
1987; E. F. Brickell, P. J. Lee & Y. Yacobi; "N-Party Audio Secrecy Identification and Signature".
Arvid S. Arora and David L. Cohn; notes on "A Report on Speech Scrambling for Privacy".
Product Descriptoin: 6000x Private Link Cellular Mobile Telephone, by Dallas Cellular.

*Primary Examiner*—Thomas H. Tarcza
*Assistant Examiner*—David Cain
*Attorney, Agent, or Firm*—David B. Newman, Jr. & Associates

[57] ABSTRACT

A integer encryptor and decryptor, with the integer encryptor comprising a pseudorandom source, a discrete-time source, guard-band means, and adding means. The pseudorandom source generates a random-data signal. The random-data signal is an integer that lies within a first-bounded range. The discrete-time source generates the input-data signal. The guard-band means is coupled to the discrete-time source. In response to the input-data signal, the guard-band means generates an output-data signal. For a second-limit number the guard-band means limits the output-data signal to lie within a second-bounded range. The second-limit number is less than the first-limit number. The modulo-adding means is coupled to the pseudorandom source and the guard-band means. The modulo-adding means repetitively adds the output-data signal with the random-data signal and a third-limit number and generates an encrypted-data signal. The present invention also includes an integer decryptor having a pseudorandom source and modulo-adding means. The pseudorandom source generates a negative-random-data signal. The negative-random-data signal is the negative of the random-data signal generated at the integer encryptor. A communications channel outputs a channel signal, with the channel signal being a sum of the encrypted-data signal and an error signal. Modulo-adding means is coupled to the communications channel. The modulo-adding means repetitively adds the negative-random-data signal, the channel signal, and a fourth-limit number, and generates a receiver-output-data signal.

8 Claims, 3 Drawing Sheets

U.S. PATENT DOCUMENTS

| | | |
|---|---|---|
| 4,100,374 | 7/1978 | Jayant et al. . |
| 4,107,458 | 8/1978 | Constant .................................. 380/48 |
| 4,126,761 | 11/1978 | Graupe et al. . |
| 4,145,568 | 3/1979 | Ehrat . |
| 4,145,569 | 3/1979 | Ehrat . |
| 4,151,373 | 4/1979 | Widmer et al. . |
| 4,188,506 | 2/1980 | Schmid et al. . |
| 4,313,031 | 1/1982 | Widmer . |
| 4,369,434 | 1/1983 | Mueller . |
| 4,379,205 | 2/1983 | Wyner . |
| 4,393,276 | 7/1983 | Steele .................................... 380/28 |
| 4,441,095 | 4/1984 | Widmer et al. . |
| 4,531,022 | 7/1985 | Pioli . |
| 4,573,205 | 2/1986 | Nash ....................................... 380/6 |
| 4,577,059 | 3/1986 | Mueller . |
| 4,589,131 | 5/1986 | Horvath et al. . |
| 4,607,375 | 8/1986 | Lee . |
| 4,618,982 | 10/1986 | Horvath et al. . |
| 4,658,096 | 4/1987 | West, Jr. et al. . |
| 4,688,257 | 8/1987 | Erickson ............................... 380/48 |
| 4,689,606 | 8/1987 | Sato . |
| 4,737,975 | 4/1988 | Shafer . |
| 4,800,590 | 1/1989 | Vaughan ............................... 380/46 |
| 4,866,771 | 9/1989 | Bain ....................................... 380/23 |
| 4,885,778 | 12/1989 | Weiss ..................................... 380/28 |
| 4,893,339 | 1/1990 | Bright et al. .......................... 380/46 |

| SAMPLE TIME | 0 | 1 | 2 | 3 | 4 | 5 | 6 | 7 |
|---|---|---|---|---|---|---|---|---|
| $S(k)$ | 7 | 0 | 7 | 0 | 7 | 0 | 7 | 0 |
| $C(k)$ | 5 | 7 | 6 | 3 | 2 | 0 | 4 | 1 |
| $S^*(k)$ | 4 | 7 | 5 | 3 | 1 | 0 | 3 | 1 |
| $n(k)$ | 2 | -1 | 1 | -2 | 0 | 0 | -2 | 1 |
| $\hat{S}^*(k)$ | 6 | 6 | 6 | 1 | 1 | 0 | 1 | 2 |
| $C(k)$ | 5 | 7 | 6 | 3 | 2 | 0 | 4 | 1 |
| $\hat{S}(k)$ | 1 | 7 | 0 | 6 | 7 | 0 | 5 | 1 |
| $S(k)-\hat{S}(k)$ | 6 | -7 | 7 | -6 | 0 | 0 | 2 | -1 |

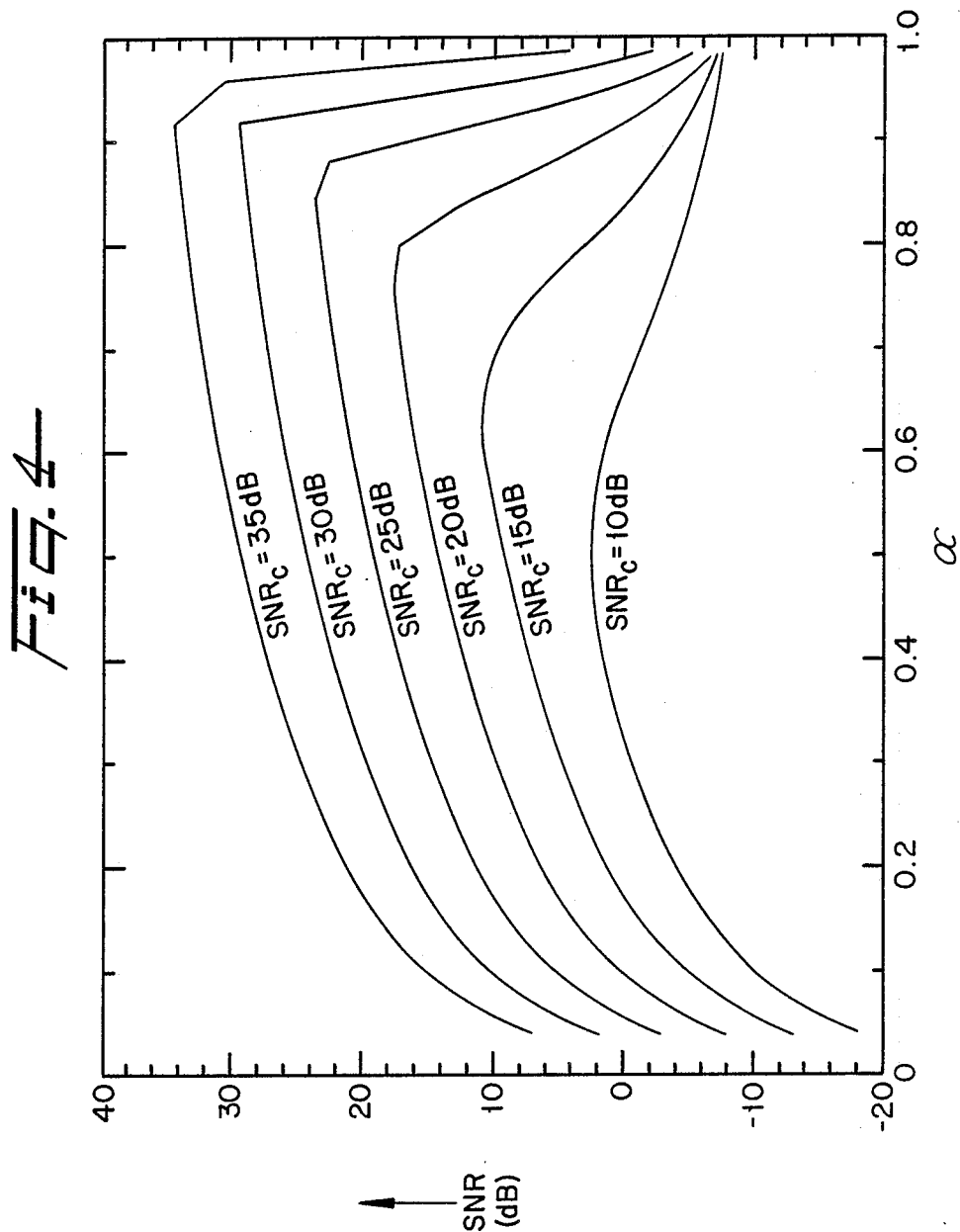

INTEGER ENCRYPTOR

BACKGROUND OF THE INVENTION

This invention relates to an encryption method and apparatus using integers.

RELATED PATENTS

This patent is related U.S. Pat. No. 4,126,761, issued Nov. 21, 1978 to Graupe et al., which is expressly incorporated herein by reference.

DESCRIPTION OF THE PRIOR ART

At present most electronic encryption processing is applied to binary sequences. Secure voice systems, for example, use a voice compression process which represents the voice waveform as a binary sequence that is then encrypted and transmitted. The security of such systems depends on how well the encryption technique protects the binary sequence. These are usually quite secure. Some less secure voice systems, called voice scramblers, use the encryption process to scramble the real-valued time samples of a voice waveform. These scramblers are less secure since the speech samples are not changed in value but only time shifted in some manner determined by the encryptor. Skilled listeners are able to understand much of the scrambled speech. Such scramblers usually have irritating delays.

U.S. Pat. No. 4,126,761 to Graupe et al., issued Nov. 21, 1978, describes a method and means for scrambling a message signal with codewords having m pulses. The disclosure includes performing a modulo v (MOD v) addition of an n-level, m-pulse codeword with an n-level digitized transformation of the input signal under the condition that m and v are integers. The resultant sum signal, after transmission through a noisy channel, is received and descrambled at the receiving end of the communications link. Descrambling is carried out as a MOD v subtraction process involving repetitively subtracting the same codeword from an n-level digitized transformation of the received signal. The subtraction is carried out in synchronism with the addition at the sending end of the communications link. The resultant difference signal is a representation of the input signal.

In E. F. Brickell, P. J. Lee, and Y. Yacobi, "Secure Audio Teleconference", CRYPTO, '87, the concept of encrypting using integers for the input signal and for the encrypting signal is disclosed. This publication teaches adding the message signal and encrypting signal modulo an integer.

While the prior art methods and apparatus work, teaching the concept of encryption using integers, a problem in the prior art is that it does not teach or suggest means for preventing channel noise from mutilating the encrypted signal. Graupe et al., col. 6, lines 26–31, states that "the maximum level of error is not more than the maximum noise amplitude which would have been present without the processing. Therefore, the processing of the present invention does not degrade intelligence more than it would have been degraded by noise in the absence of such processing." As shown in FIG. 1, an example is given for the chart of Graupe et al., col. 4–5, for which the error amplitude exceeds the noise amplitude. For the example shown, at sample times 0, 1, 2, 3, the errors are much larger than noise values. Thus, the method taught by Graupe et al. and or Brickell et al. would significantly degrade the input data signal when used in a noise channel, because peak values of the signal are likely to be badly distorted.

OBJECTS AND SUMMARY OF THE INVENTION

An object of the present invention is to provide an integer encryptor and decryptor for use on a noisy communications channel.

Another object of the invention is to provide an integer encryptor and decryptor that is simple and easy to use.

A further object of the invention is to provide an integer encryptor that is as secure as applying the same encryption process to binary sequences.

According to the present invention, as embodied and broadly described herein, an integer encryptor and an integer decryptor are provided. The integer encryptor comprises a pseudorandom source, a discrete-time source, guard-band means, and modulo-adding means. The pseudorandom source generates, at each time instant, $t_i$, a random-data signal, $d_i$. The random-data signal is an integer that lies within a first-bounded range, $-B \leq d_i < B$. The discrete-time source generates, at each time instant, $t_i$, the input-data signal, $s_i$. The input-data signal $s_i$ is an integer. The guard-band means is coupled to the discrete-time source. In response to the input-data signal, $s_i$, the guard-band means generates an output-data signal, $x_i$. For a second-limit number, A, the guard-band means limits the output-data signal to lie within a second-bounded range, $-A \leq x_i \leq A$. The second-limit number is less than the first-limit number, $A < B$. The modulo-adding means is coupled to the pseudorandom source and the guard-band means. The modulo-adding means repetitively adds the output-data signal with the random-data signal and a third-limit number, $K_i$, and generates an encrypted-data signal, $c_i$, according to a relationship $c_i = x_i + d_i + 2K_iB$. The third-limit number, $K_i$, is an integer that results in the encrypted-data signal lying within the range $-B \leq c_i < B$.

The present invention also includes an integer decryptor. The integer decryptor comprises a pseudorandom source and modulo-adding means. The pseudorandom source generates, at each time instant, $t_i$, a negative-random-data signal, $-d_i$. The negative-random-data signal is the negative of the random-data signal generated at the integer encryptor. A communications channel outputs, at each time instant, $t_i$, a channel signal, $y_i$, with the channel signal being a sum of the encrypted-data signal, $c_i$, and an error signal, $e_i$. Module-adding means is coupled to the communications channel. The modulo-adding means repetitively adds the negative-random-data signal, $-d_i$, the channel signal, $y_i$, and a fourth-limit number, $L_i$, and generates a receiver-output-data signal, $z_i$, according to a relationship $z_1 = y_i + (-d_i) + 2L_iB$. The fourth-limit number, $L_i$, is an integer that results in the receiver-output-data signal lying within an output-bounded range, wherein $-B \leq z_i < B$.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 4 is a chart showing the effect of an encryption process according to the present invention on signal-to-noise ratio.

DETAILED DESCRIPTION OF THE PREFERRED EMBODIMENTS

Reference will now be made to the present preferred embodiments of the invention, examples of which are illustrated in the accompanying drawings.

Figure 2:
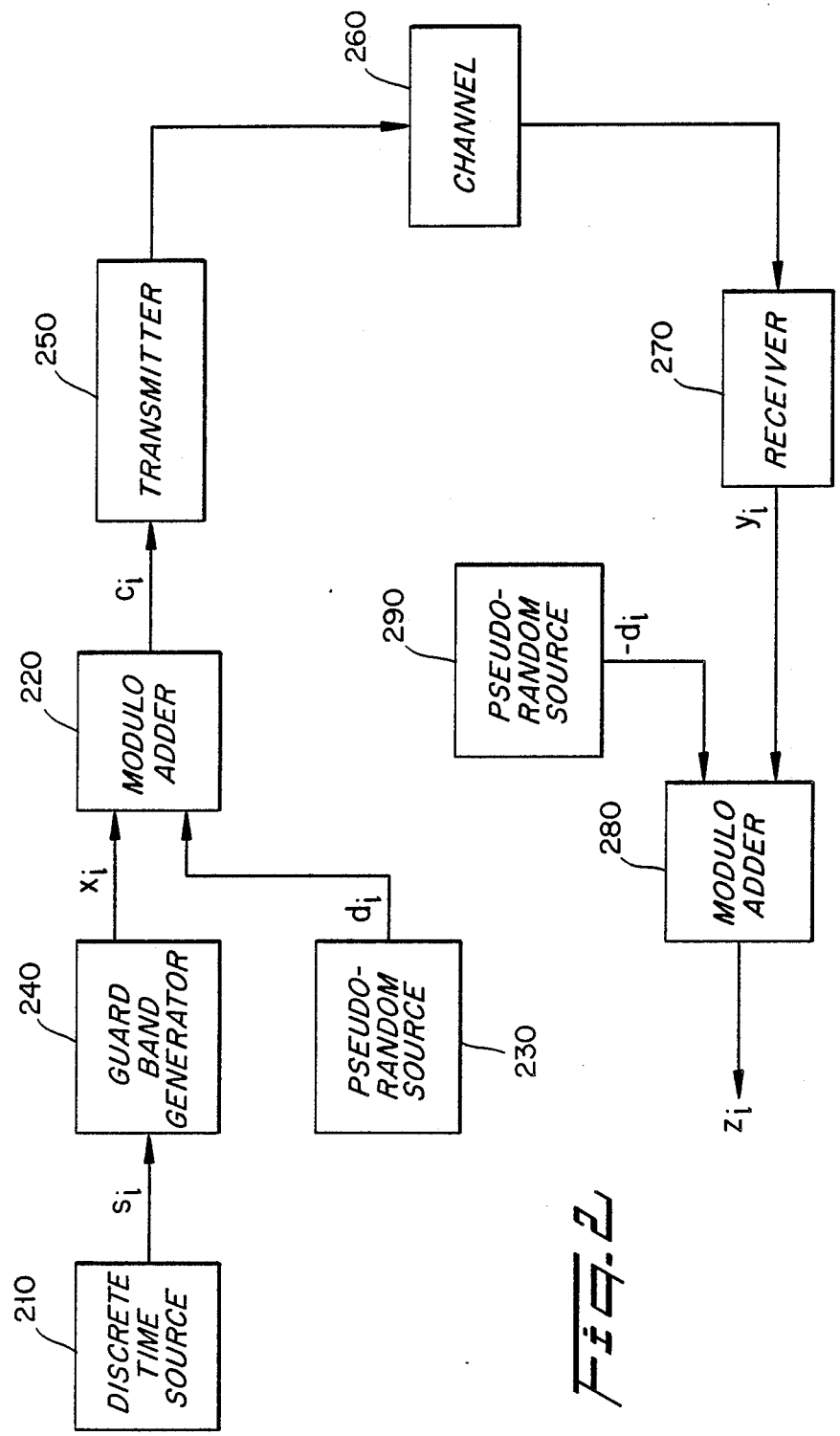
FIG. 2 is a block diagram showing an integer encryptor and decryptor according to the present invention.

Referring to FIG. 2, a preferred embodiment of the present invention is shown including an integer encryptor and an integer decryptor. The integer encryptor comprises a pseudorandom source 230, a discrete-time source 210, guard-band means, and adding means. The guard-band means may be embodied as a guard-band generator 240. The adding means may be embodied as a modulo adder 220. The discrete-time source 210 is coupled to the guard-band generator 240. The pseudorandom source 230 and the guard-band generator 240 are coupled to the modulo adder 220.

The pseudorandom source 230 generates, at each time instant, $t_i$, a random-data signal, $d_i$. The time instant, $t_i$, is not restricted to uniformly spaced time intervals having period T. The random-data signal is an integer having b-bits, with $b \geq 2$. For a first-limit number, B, the random-data signal lies within a first-bounded range, $-B \leq d_i < B$.

The discrete-time source 210 outputs, at each time instant, $t_i$, an input-data signal, $s_i$. The input-data signal, $s_i$, can be an integer.

Practically, the restriction to integer-valued sources is not significant. In any digital system, real valued sources are approximated as integers, usually through analog-to-digital converters. The approximation can be made as precise as needed.

The guard-band generator 240 is coupled to the discrete-time source and is responsive to the input-data signal, $s_i$, for generating an output-data signal, $x_i$. For a second-limit number, A, the output-data signal lies within a second-bounded range, $-A \leq x_i \leq A$, with the second-limit number less than the first-limit number, $A < B$. The guard-band generator 240 essentially restricts the input-data signal, $s_i$, to the range $\pm A$. Thus, the output-data signal, $x_i$, is the integer nearest the input-data signal, $s_i$, satisfying $-A \leq x_i \leq A$.

The modulo adder 220 is coupled to the pseudorandom source 230 and the guard-band generator 240. The modulo adder 220 repetitively adds the output-data signal with the random-data signal and a third-limit number, $K_i$, and generates an encrypted-data signal, $c_i$, according to a relationship $c_i = x_i + d_i + 2K_iB$. The third-limit number, $K_i$, is an integer that results in the encrypted-data signal lying within the range $-B \leq c_i < B$.

Restricting the range of the discrete-time source 210 is an issue with which a designer has to deal. For example, analog-to-digital converters have a fixed range, such as 16-bit linear converters used in high-fidelity audio or 8-bit companding converters used in telephony. The restricted range could be part of the source itself. The present invention focuses attention on the guard band, which is the difference between the second-limit number and the first-limit number, B - A. The present disclosure shows that the larger the difference between the second-limit number and the first-limit number, B - A, the less effect channel noise will have on the encryption/decryption process.

In operation, the encrypted-data signal is transmitted by a transmitter 250 over a communications channel 260 to a receiver 270.

As illustratively shown in FIG. 2, the present invention also includes an integer decryptor. The integer decryptor comprises a pseudorandom source 290 and adding means. The adding means may be embodied as a modulo adder 280.

The pseudorandom source 290 generates, at each time instant, $t_i$, a negative-random-data signal, $-d_i$. The negative-random-data signal has b-bits, with $b \geq 2$. The negative-random-data signal is the negative of the random-data signal generated at the integer encryptor for encrypting the encrypted-data signal, $c_i$.

A communications channel 260 outputs, at each time instant, $t_i$, a channel signal, $y_i$. The channel signal is a sum of the encrypted-data signal, $c_i$, and an error signal, $e_i$.

The modulo adder 280 is coupled to the communications channel 260 through receiver 270. The modulo adder 280 repetitively adds the negative-random-data signal, $-d_i$, the channel signal, $y_i$, and a fourth-limit number, $L_i$, and generates a receiver-output-data signal, $z_i$, according to a relationship $z_i = y_i + (-d_i) + 2L_iB$. For a first-limit number, B, the fourth-limit number, $L_i$, is an integer that results in the receiver-output-data signal lying within an output-bounded range, wherein $-B \leq z_i < B$.

The present invention further includes a method using a first processor for encrypting an input-data signal for transmission through a noisy communications channel. The method comprises the steps of generating, at each time instant, $t_i$, a random-data signal, $d_i$. The random-data signal has b-bits. The random-data signal lies within a first-bounded range, $-B \leq d_i < B$. The method also generates, at each time instant, $t_i$, the input-data signal, $s_i$, and from the input-data signal, $s_i$, generates an output-data signal, $x_i$. For a second-limit number, A, the output-data signal lies within a second-bounded range, $-a \leq x_i \leq A$, with the second-limit number less than the first-limit number, $A < B$. The method further repetitively adds, with the first processor, the output-data signal with the random-data signal and a third-limit number, $K_i$, and generates an encrypted-data signal, $c_i$, according to a relationship $c_i = x_i + d_i + 2K_iB$. The third-limit number, $K_i$, is an integer that results in the encrypted-data signal lying within the range $-B \leq c_i < B$.

A method further is provided using a second processor for decrypting the encrypted-data signal. The method comprises the steps of receiving, from a communications channel, a channel signal, $y_i$. The channel signal is a sum of the encrypted-data signal, $c_i$, and an error signal, $e_i$. The method also includes generating, at each time instant, $t_i$, a negative-random-data signal, $-d_i$, with the negative-random-data signal being a negative of the random-data signal generated at the integer encryptor for encrypting the encrypted-data signal, $c_i$. The method further includes repetitively adding the negative-random-data signal, $-d_i$, the channel signal, $y_i$, and a fourth-limit number, $L_i$, and generating a receiver-output-data signal, $z_i$, according to a relationship $z_i = y_i + (-d_i)2L_iB$. For a first-limit number, B, the fourth-limit number, $L_i$, is an integer that results in the receiver-output-data signal lying within an output-bounded range, wherein $-B \leq z_i < B$.

THEORY OF THE INVENTION

The encryption process is given by $$c = x \oplus d$$

where $x \oplus d$ is defined as $x+d+2KB$, with K the integer that results in the sum lying in the range $[-B,B)$.

If we assume that d is a random variable uniformly distributed over the integers in [31 B,B), then c is also a random variable uniformly distributed over the same interval. This is true even when x is given. Thus this encryption process is as secure as the commonly used corresponding binary encryption technique where the pseudo random binary sequence is added modulo-2 to the data bit sequence.

Next we assume that c is sent over an additive noise channel where the channel output is given by $$y = c + e$$

where e is a real-valued noise random variable. Decryption is done by $$z = y \oplus (-d).$$

Figures 1, 3:
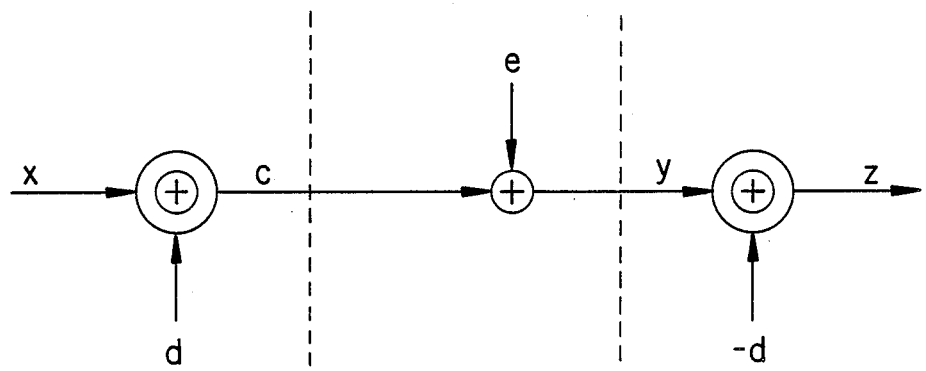
FIG. 1 is a chart showing where the error amplitude can exceed the noise amplitude.
FIG. 3 is a schematic diagram for calculating the effect of noise on an encrypted-data signal according to the present invention.

The term z is an estimate of the original message x. The overall system is illustrated in FIG. 3.

PERFORMANCE OF THE INVENTION

The encryption process described above is as secure as any binary encryption system using the same pseudo random sequence. The important question is; "How well does z estimate x when the channel has additive noise?"

For real-valued sources the most common measures of accuracy in estimation is based on the absolute difference $|z-x|$. For the additive noise channel without the encryption process we have $$|z-x| = |e|.$$

For the system described above we have in general the inequality $$|z-x| \leq 2B.$$

In addition we make the following claim.
CLAIM If $|x+e| < B$ then $z = x+e$.
PROOF Note that $$c = x + d + 2KB$$

for some integer K which places this sum in the interval $[-B,B)$. Next note that $$z = y - d + 2LB$$

for some integer L which places this sum in the interval $[-B, B)$. By substitution of $y = c+e$ in the above equalities the estimate has the form $$\begin{aligned} z &= x + d + e + 2KB - d + 2LB \\ &= x + e + 2(K+L)B. \end{aligned}$$

If $|x+e| < B$ then $x+e$ is in the interval $[-B, B)$ and thus $K + L = 0$ and $$z = x + e.$$

Using the claim that $z - x = e$ if $|x+e| < B$, we can upper bound the mean squared error as follows $$E\{|z-x|^2\} = E\{|z-x|^2 \mid |x+e| < B\} Pr\{|x+e| < B\} +$$
$$E\{|z-x|^2 \mid |x+e| \geq B\} Pr\{|x+e| \geq B\} \leq E\{|e|^2\} +$$
$$4B^2 Pr\{|x+e| \geq B\}.$$

The term $E\{|e|^2\}$ is the noise power generated by the channel, regardless of whether or not we encrypt x. The second term is an upper bound on the noise power generated by the encryption technique. It represents a degradation that would not be present if we did not encrypt x. We can break it down further using the bound:

$$Pr\{|x+e| \geq B\} \leq Pr\{x \geq 0, e \geq B - A\} +$$
$$Pr\{x \geq 0, e \leq -B\} + Pr\{x < 0, e \leq A - B\} +$$
$$Pr\{x < 0, e \geq B\} = \tfrac{1}{2} Pr\{|e| \geq B\} + \tfrac{1}{2} Pr\{|e| \geq B - A\}.$$

The right most expression assumes that x and e are independent and symmetrically distributed about 0. $Pr\{|e| > B\}$ is a function of the signal-to-noise ratio $SNR_c$ of the channel, since B is the amplitude of the channel signal and e is the channel noise. It is a given parameter over which a designer has little control. $Pr\{|e| \geq B-A\}$, on the other hand, is a function of the unencrypted signal level A as well as $SNR_c$. It can be made small, or at least comparable to $Pr\{|e| \geq B\}$, by picking A sufficiently smaller than B. We cannot, however, pick A too small, since the smaller we pick A, the less power there is in the recovered signal.

To illustrate the tradeoff involved in picking A, consider the signal-to-noise ratio $SNR_r$ of the recovered signal:

$$SNR_r = \frac{E\{|x|^2\}}{E\{|z-x|^2\}} \geq \quad (1)$$

$$\frac{k^2 A^2}{\sigma^2 + 2B^2 [Pr\{|e| \geq B\} + Pr\{|e| \geq B - A\}]}$$

where $k^2$ is a constant that relates the mean squared value $E\{|x|^2\}$ of x to its peak squared value $A^2$, and $\sigma^2 = E\{|e|^2\}$ is the noise power of the channel. The expression on the right tends to 0 as A tends to 0; that is, the SNR vanishes with A because the power in x vanishes. On the other hand, letting A tend to B means that the denominator tends, roughly to $\sigma^2 + 2B^2$, so that the right most expression in (1) is roughly $k^2/2$, which is less than 1. Thus it is desirable not to have A too large.

To investigate a suitable choice of A, let us assume that the channel noise e is zero mean, Gaussian, with variance $\sigma^2$. This gives us $$Pr\{|e| \geq B - A\} = 2Q\left(\frac{B-A}{\sigma}\right) \quad (2)$$

$$Pr\{|e| \geq B\} = 2Q(B),$$

where $$Q(x) = \frac{1}{2\pi} \int_x^\infty e^{-\lambda^2/2} d\lambda$$

Since the encrypted signal is uniformly distributed on $[-B,B)$, its variance is $B^2/3$. Hence the channel signal-to-noise ratio, $SNR_c$, is $$SNR_c = \frac{E\{|c|^2\}}{E\{|e|^2\}} = \frac{B^2}{3\sigma^2} \quad (3)$$

For convenience, define $\alpha = A/B$. Substituting (2) into (1), dividing numerator and denominator by $\sigma^2$, and substituting (3) into the result yields:

$$SNR_r \geq \frac{\alpha^2 SNR_c}{1 + 12 SNR_c [Q(\sqrt{3SNR_c}(1-\alpha)) + Q(\sqrt{3SNR_c})]} 3k^2 \quad (4)$$

The $3k^2$ factor represents the dependence of $SNR_r$ on the peak-to-rms ratio of x; e.g., if x is uniformly distributed, then $3k^2 = 1$. For any channel with a peak amplitude constraint, as opposed to an average power constraint, this factor would be present, even if x is not encrypted by the process we describe here. The rest of the right-hand side of (4) (i.e., the fraction) describes the effect of the encryption process on the SNR, as the function of $\alpha$ and $SNR_c$. Call this quantity $D(\alpha, SNR_c)$. The quantity is easily evaluated numerically for a particular choice of $\alpha$ and $SNR_c$.

FIG. 4 plots $D(\alpha, SNR_c)$ as of function of $\alpha$ for several choices of $SNR_c$. The plot shows that for a good channel, i.e., one with a 25 dB $SNR_c$ or better, $\alpha$ can be chosen in the range of 0.8 to 0.9, so that $D(\alpha, SNR_c)$ is only about 1 dB less than $SNR_c$. For a poor channel, i.e., one with a 15 dB $SNR_c$, $\alpha$ must be chosen around 0.65 or so, so that $D(\alpha, SNR_c)$ is about 5 dB less than $SNR_c$. But even this amount of degradation is not bad, since a 3 dB degradation is about the threshold of perceptibility. For a very poor channel, i.e., $SNR_c = 10$ dB, $\alpha$ must be picked to be about 0.5, and the recovered $SNR_r$ is only about 2 dB. This renders the recovered signal useless. However, the 10 dB channel is nearly useless for unencrypted signals, since 10 dB is about the threshold of intelligibility. The conclusion is that for practical channels, the degradation introduced by the encryption process is quite acceptable.

APPLICATIONS OF THE INVENTION

The technique described here can easily be generalized to sequences of numbers that are equally spaced points in any interval. By increasing the number of bits used for each pseudo random number out of the generator, this is essentially an encryption technique for real-valued sequences where each source output or sample x is a bounded integer. That is, this technique is, to as accurately an approximation as desired, a bounded real-valued sequence encryption technique.

The primary application for this encryption technique is for secure voice systems for telephone and radio channels. Here the transmission medium will typically be the telephone channel using modified modems that transmit sequences of bounded numbers and the various radio channels where the most common are FM radios. By transmitting sequences of bounded integers, higher quality lower cost secure voice systems can be implemented. For both the telephone and FM radio channels, existing techniques for digital modulation will have to be modified to accommodate sequences of integers.

FM Radio Application:

Most FM radios are designed to transmit analog waveforms or binary data. Here we describe an FM radio modem that is designed to transmit sequences of real-valued numbers. The data source in this case can be a sampled speech waveform or any continuous-time bandlimited waveform that is sampled. One application of this sampled data FM modem is the use of the integer valued encryptor described here for secure voice over FM radios.

Any bandlimited continuous-time waveform x(t), has the sampling representation $$x(t) = \sum_k x(kT) f(t - kT)$$

where f(t) is the ideal bandlimited (sin x)/x type pulse with properties $f(0) = 1, f(kT) = 0$ for all $k \neq 0$.

In this technique we use the above samples, (x(kT)), to generate the approximate waveform $$\hat{x}(t) = \sum_k x(kT) \hat{f}(t - kT)$$

where $\hat{f}(t)$ also has the properties $\hat{f}(0) = 1, \hat{f}(kT) = 0$ for all $k \neq 0$.

The pulse $\hat{f}(t)$ is designed with several properties.

First, we choose this pulse such that it is easy to recover sample times from the approximate waveforms. Then from this approximate waveform $\hat{x}(t)$ we can recover the original samples by $$X(kT) = \hat{x}(t)|_{t=kT}$$

Second, we choose the pulse $\hat{f}(t)$ such that if we enter the approximate signal $\hat{x}(t)$ into a FM radio input, the analog FCC Mask is met by the transmitted signal.

We have shown that with overlapping pulses, the CPM modulation with binary data can meet the digital FCC Mask at data rates up to 16 Kbps. By reducing the pulse rate from 16,000 pulses per second to 8,000 pulses per second we should be able to achieve our goal of sending 8,000 samples per second using non-overlapping pulses that are easy to synchronize and still meet the analog FCC Mask.

The primary application for this sampled data FM radio modem is the transmission of secure voice radio systems. In particular this is a technique that can be used in the cellular radio market where it is easy to eavesdrop on conversations.

Telephone Applications

Suppose we take the voice waveform v(t) which has been filtered down to 3 KHz. We then have the relationship $$v(t) = \sum_k v_k f(t - kT)$$

where f(t) is the ideal bandpass (sin x)/x pulse and $\{v_k\}$ are samples taken 6,000 times a second. After encrypting $\{v_k\}$ to $\{y_k\}$ we can send over the telephone channel the ideal 3 KHz bandlimited waveform $$y(t) = \sum_k y_k f(t - kT)$$

If we send a sample time reference signal we can assume known sample times at the receiver.

The received signal $$z(t) = y(t)$$

can be sampled at the correct times and then passed through an adaptive equalizer followed by decryption. Since the transmitted signal is an ideal bandlimited signal, the adaptive equalizer should force the received signal to have a flat spectrum over the 3 kHz band.

It will be apparent to those skilled in the art that various modifications can be made to the integer encryptor of the instant invention without departing from the scope or spirit of the invention, and it is intended that the present invention cover modifications and variations of the integer encryptor provided they come within the scope of the appended claims and their equivalents. Further, it is intended that the present invention cover present and new applications of the integer encryptor, including, but not limited to. Sending parameter of speech models rather than speech samples as well as any other set of parameters and samples of signals.

We claim:

1. An integer encryptor for encrypting an input-data signal comprising:
   a pseudorandom source for generating, at each time instant, $t_i$, a random-data signal, $d_i$, with the random-data signal having b-bits, with $b \geq 2$, and for a first-limit number, B, with the random-data signal lying within a first-bounded range, $-B \leq d_i < B$;
   a discrete-time source for outputting, at each time instant, $t_i$, the input-data signal, $s_i$;
   guard-band means coupled to said discrete-time source and responsive to the input-data signal, $s_i$, for generating an output-data signal, $x_i$, wherein for a second-limit number, A, the output-data signal lies within a second-bounded range, $-A \leq x_i \leq A$, with the second-limit number less than the first-limit number, $A < B$; and
   means coupled to said pseudorandom source and said guard-band means for repetitively adding the output-data signal with the random-data signal and a third-limit number, $K_i$, for generating an encrypted-data signal, $c_i$, according to a relationship $c_i = x_i + d_i + 2K_i B$, with the third-limit number, $K_i$, being an integer that results in the encrypted-data signal lying within the range $-B \leq c_i < B$.

2. An apparatus for decrypting an encrypted-data signal comprising:
   a pseudorandom source for generating, at each time instant, $t_i$, a negative-random-data signal, $-d_i$, with the negative-random-data signal having b-bits, with $b \geq 2$, with the negative-random-data signal being the negative of a random-data signal generated at an integer encryptor for encrypting the encrypted-data signal, $c_i$, respectively;
   a communications channel for outputting, at each time instant, $t_i$, a channel signal, $y_i$, with the channel signal being a sum of the encrypted-data signal, $c_i$, and an error signal, $e_i$; and
   means coupled to said communications channel for repetitively adding the negative-random-data signal, $-d_i$, the channel signal, $y_i$, and a fourth-limit number, $L_i$, for generating a receiver-output-data signal, $z_i$, according to a relationship $z_i = y_i + (-d_i) + 2L_i B$, and for a first-limit number, B, with the fourth-limit number, $L_i$, being an integer that results in the receiver-output-data signal lying within an output-bounded range, wherein $-B \leq z_i < B$.

3. The apparatus as set forth in claim 2 wherein said pseudorandom-sequence source includes means for adjusting the time relationship of the generation of the negative-random-data signal at said decrypting apparatus with the random-data signal at said encryption apparatus.

4. An apparatus for encrypting an input-data signal comprising:
   a pseudorandom source for generating a random-data signal;
   a discrete-time source for outputting the input-data signal;
   guard-band means coupled to said discrete-time source and responsive to the input-data signal for generating an output-data signal wherein a magnitude of an amplitude of the output-data signal is less than a magnitude of an amplitude of the random-data signal; and
   means coupled to said pseudorandom source and said guard-band means for repetitively adding the output-data signal with the random-data signal and a third-limit number, for generating an encrypted-data signal, with the third-limit number being an integer that results in the encrypted-data signal lying within a first-bounded range.

5. An apparatus for decrypting an encrypted-data signal comprising:
   a pseudorandom source for generating a negative-random-data signal;
   a communications channel for outputting a channel signal with the channel signal being the sum of the encrypted-data signal and an error signal; and
   means coupled to said communications channel for repetitively adding the negative-random-data signal, the channel signal, and a fourth-limit number, for generating a receiver-output-data signal, and with the fourth-limit number being an integer that results in the receiver-output-data signal lying within an output-bounded range.

6. The apparatus as set forth in claim 5 wherein said pseudorandom-sequence source includes means for adjusting the time relationship of the generation of the negative-random-data signal at said decrypting apparatus with the random-data signal at an encryption apparatus.

7. A method using a first processor for encrypting an input-data signal for transmission through a noisy communications channel, comprising the steps, using said first processor, of:
   generating, at each time instant, $t_i$, a random-data signal, di, and for a first-limit number, B, with the random-data signal lying within a first-bounded range, $-B \leq d_i$ generating, at each time instant, $t_i$, the input-data signal, $s_i$;

generating from the input-data signal, $s_i$, an output-data signal, $x_i$, wherein for a second-limit number, A, the output-data signal lies within a second-bounded range, $=A \leq x_i \leq A$, with the second-limit number less than the first-limit number, $A < B$; and repetitively adding, with the first processor, the output-data signal with the random-data signal and a third-limit number, $K_i$, for generating an encrypted-data signal, $c_i$, according to a relationship $c_i = x_i + d_i + 2K_iB$, *with the third-limit number, $K_i$, being an integer that results in the encrypted-data signal lying within the range $-B \leq c_i < B$.*

8. A method using a second processor for decrypting an encrypted-data signal, comprising the steps, using said second processor, of:

receiving, from a communications channel, a channel signal, $y_i$, with the channel signal being a sum of the encrypted-data signal, $c_i$, and an error signal, $e_i$;

generating, at each time instant, $t_i$, a negative-random-data signal, $-d_i$, with the negative-random-data signal being a negative of a random-data signal generated at an integer encryptor for encrypting the encrypted-data signal, $c_i$, respectively; and repetitively adding the negative-random-data signal, $-d_i$, the channel signal, $y_i$, and a fourth-limit number, $L_i$, for generating a receiver-output-data signal, $z_i$, according to a relationship $z_i = y_i + (-d_i) + 2L_iB$, and for a first-limit number, B, with the fourth-limit number, $L_i$, being an integer that results in the receiver-output-data signal lying within an output-bounded range, wherein $-B \leq z_i < B$.

* * * * *